(12) United States Patent
Jalbert et al.

(10) Patent No.: US 7,748,089 B2
(45) Date of Patent: Jul. 6, 2010

(54) AUGER CLIP ASSEMBLY

(75) Inventors: Shaun Jalbert, Barrie (CA); Marc Risdale, Dundas (CA)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 12/267,278

(22) Filed: Nov. 7, 2008

(65) Prior Publication Data

US 2009/0178249 A1 Jul. 16, 2009

Related U.S. Application Data

(60) Provisional application No. 61/021,224, filed on Jan. 15, 2008.

(51) Int. Cl.
*A44B 1/28* (2006.01)
*F16B 2/20* (2006.01)

(52) U.S. Cl. .......................... 24/297; 411/508

(58) Field of Classification Search .................. 24/297, 24/663, 453, 458; 411/508, 913, 349, 549, 411/553, 550, 551
See application file for complete search history.

(56) References Cited

U.S. PATENT DOCUMENTS

| | | | | | |
|---|---|---|---|---|---|
| 2,636,533 | A | * | 4/1953 | Tinnerman | 411/107 |
| 2,826,388 | A | * | 3/1958 | Janos et al. | 248/239 |
| 3,309,955 | A | * | 3/1967 | Turnbull et al. | 411/509 |
| 3,379,090 | A | * | 4/1968 | Parkin | 411/427 |
| 3,954,344 | A | * | 5/1976 | Nakama | 403/14 |
| 4,393,551 | A | * | 7/1983 | Wollar et al. | 24/627 |
| 4,400,336 | A | * | 8/1983 | Thomas | 264/46.7 |
| 4,457,050 | A | * | 7/1984 | Kanzaka | 24/108 |
| 4,810,147 | A | * | 3/1989 | Hirohata | 411/349 |
| 4,900,210 | A | * | 2/1990 | Buchanan et al. | 411/508 |
| 4,987,656 | A | * | 1/1991 | Sato | 24/297 |
| 5,142,834 | A | * | 9/1992 | Laclave et al. | 52/208 |
| 5,332,347 | A | * | 7/1994 | Kimisawa | 411/182 |
| 5,368,427 | A | * | 11/1994 | Pfaffinger | 411/553 |
| 5,651,634 | A | * | 7/1997 | Kraus | 403/408.1 |
| 5,694,666 | A | * | 12/1997 | Hamamoto | 24/297 |
| 5,716,161 | A | | 2/1998 | Moore et al. | |
| 6,039,523 | A | * | 3/2000 | Kraus | 411/48 |
| 6,238,156 | B1 | * | 5/2001 | Leibman | 411/182 |
| 6,305,055 | B1 | | 10/2001 | Castro | |
| 6,572,317 | B2 | * | 6/2003 | Okada et al. | 411/508 |

(Continued)

OTHER PUBLICATIONS

International Search Report and Written Opinion for PCT/US2008/085379.

*Primary Examiner*—Victor Batson
*Assistant Examiner*—Rowland D Do
(74) *Attorney, Agent, or Firm*—Mark W. Croll; Paul F. Donovan (57) ABSTRACT

An auger clip assembly configured to be secured to a foam panel may include a main body having a cylindrical main wall that define a central chamber, a first set of opposed threads radially extending from the main wall and a connection stud secured to the main body. Each of the threads includes a leading edge connected to a trailing end, which is in turn connected to a stop flap that outwardly extends from the main wall. The connection stud is configured to securely mate into a reciprocal hole of a structure, such as a vehicle frame. The main body securely connects within a mating hole of the foam panel through a quarter turn.

25 Claims, 7 Drawing Sheets

U.S. PATENT DOCUMENTS

| | | | |
|---|---|---|---|
| 6,612,795 B2 * | 9/2003 | Kirchen | 411/508 |
| 6,659,701 B1 * | 12/2003 | Risdale | 411/508 |
| 7,114,221 B2 * | 10/2006 | Gibbons et al. | 24/289 |
| 7,481,474 B2 * | 1/2009 | Higgins et al. | 296/1.08 |
| 7,549,199 B2 * | 6/2009 | Bugner | 24/297 |
| 2001/0004784 A1 * | 6/2001 | Calabrese | 16/8 |
| 2006/0000064 A1 | 1/2006 | Leverger et al. | |
| 2007/0098523 A1 | 5/2007 | Klein | |
| 2008/0201920 A1 | 8/2008 | Jatzke | |
| 2008/0298890 A1 * | 12/2008 | Koike | 403/408.1 |

\* cited by examiner

AUGER CLIP ASSEMBLY

RELATED APPLICATIONS

This application relates to and claims priority benefits from U.S. Provisional Patent Application No. 61/021,224 entitled "Auger Clip Assembly," filed Jan. 15, 2008, which is hereby incorporated by reference in its entirety.

FIELD OF EMBODIMENTS OF THE INVENTION

Embodiments of the present invention generally relate to a clip assembly, and more particularly to an auger clip assembly used to secure a foam panel to another component, such as a vehicle frame.

BACKGROUND

During the manufacturing process of an automobile, a clip may be fastened to a door panel that secures a frame of the door to another structural component of the automobile. The door panel itself may be a complex assembly including numerous parts. A foam panel may be positioned on or within a door panel, to dampen vibrations and provide insulation. As such, the foam panel typically needs to be secured to a structural component, such as a steel door frame.

Figure 1:
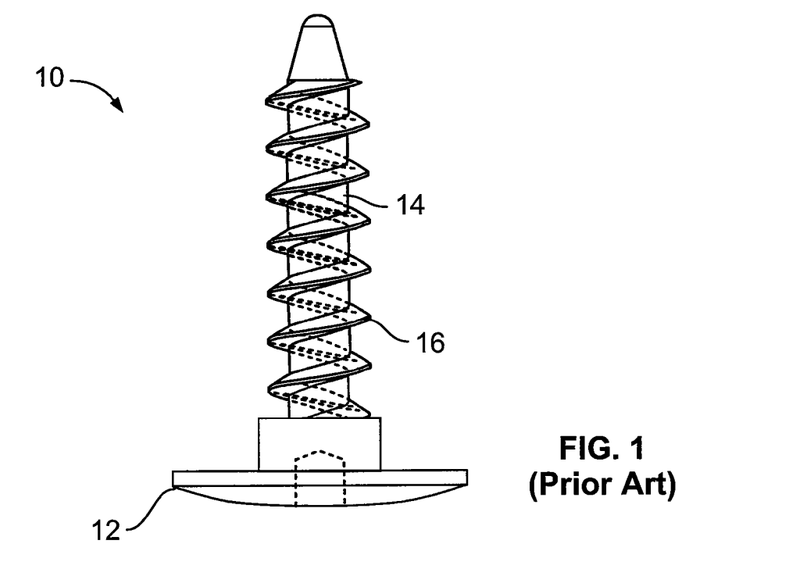
FIG. 1 illustrates a front view of a conventional auger screw.

FIG. 1 illustrates a front view of a conventional auger screw 10. The auger screw 10 includes a base 12 integrally connected to a shaft 14 having a contiguous thread 16 that winds from a bottom of the shaft 14 toward a distal tip of the screw 10. The auger screw 10 provides high extraction forces. Due to the full thread on the shaft 14, however, the auger screw 10 typically needs to be rotated numerous times (e.g., seven or eight) with respect to a component to securely fasten the component to another structure. Thus, use of the auger screw 10 typically results in slow installation, sluggish cycle times and complex automation.

SUMMARY OF EMBODIMENTS OF THE INVENTION

Certain embodiments of the present invention provide an auger clip assembly configured to be secured to a foam panel. The assembly may include a main body having a cylindrical main wall that defines a central chamber, a first set of opposed threads radially extending from the main wall and a connection stud secured to the main body. Each of the threads includes a leading edge connected to a trailing end, which is in turn connected to a stop flap that outwardly extends (such as tangentially) from the main wall. The connection stud is configured to securely mate into a reciprocal hole of a structure. The main body securely connects to the foam panel within a mating hole through a quarter turn.

The connection stud may be secured to the main wall through a hub secured within the central chamber through a plurality of flex ribs that integrally connect to the main wall. The plurality of flex ribs allow the connection stud to shift into an aligned position with respect to the reciprocal hole.

The assembly may also include a flange that prevents the auger clip assembly from completely passing through the mating hole. The flange may include at least one notch configured to be engaged by a tool that is used to rotate the main body.

The first set of opposed threads may include two threads equally spaced from one another about the main wall. Each of the threads may be pitched, such that a leading edge is positioned below (or above, depending on the orientation) a trailing end.

The mating hole may be asymmetrical. The main body passes into the mating hole when aligned in a first, passing orientation. In this orientation, asymmetrical portions of the clip assembly are aligned with reciprocal asymmetrical features of the mating hole to allow the clip assembly to pass into the mating hole. For example, the mating hole may include a central cylindrical channel connected to a first lateral wing channel oriented in a first direction and a second lateral wing channel oriented in a second direction.

The connection stud may include a first securing configuration (such as opposed prongs). The connection stud may be interchangeable with another connection stud having a second securing configuration (such as a W-base configuration). The connection stud may rotatably lock into a secured position with respect to the main body through a quarter turn.

The main body may include a base and/or a shaft. Additional sets of opposed threads may radially extend from the main wall. The first set of opposed threads is located on a different level than additional sets of opposed threads.

Certain embodiments of the present invention provide a securing system including a foam panel having an asymmetrical mating hole and an auger clip assembly configured to be secured or within the mating hole of the foam panel. The auger clip assembly may include a main body having a cylindrical main wall that defines a central chamber, a first set of opposed threads radially extending from the main wall and a connection stud secured to the main body. Each thread may include a leading edge connected to a trailing end, which is in turn connected to a stop flap that outwardly extends from the main wall. The main body passes into the mating hole when aligned in a passing orientation in which the opposed threads are aligned with thread openings formed in the mating hole. The mating hole prevents the main body from passing therein if the main body is aligned in an orientation other than the passing orientation.

Certain embodiments of the present invention provide an auger clip assembly configured to be secured to a foam panel. The auger clip assembly may include a main body having a cylindrical main wall that defines a central chamber, a first set of opposed threads radially extending from the main wall, a flange and a connection stud.

The set of opposed threads includes two threads equally spaced from one another about the main wall. Each thread is pitched and includes a leading edge connected to a trailing end, which is in turn connected to a stop flap that tangentially extends from the main wall. The main body securely connects to a foam panel within an asymmetrical mating hole through a quarter turn, wherein foam surrounding the mating hole displaces around the threads during the quarter turn to secure the main body to the foam panel.

The flange prevents the auger clip assembly from completely passing through the mating hole. The flange includes opposed notches, thereby forming a cog, configured to be engaged by a tool that is used to rotate the main body.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

Figure 2:
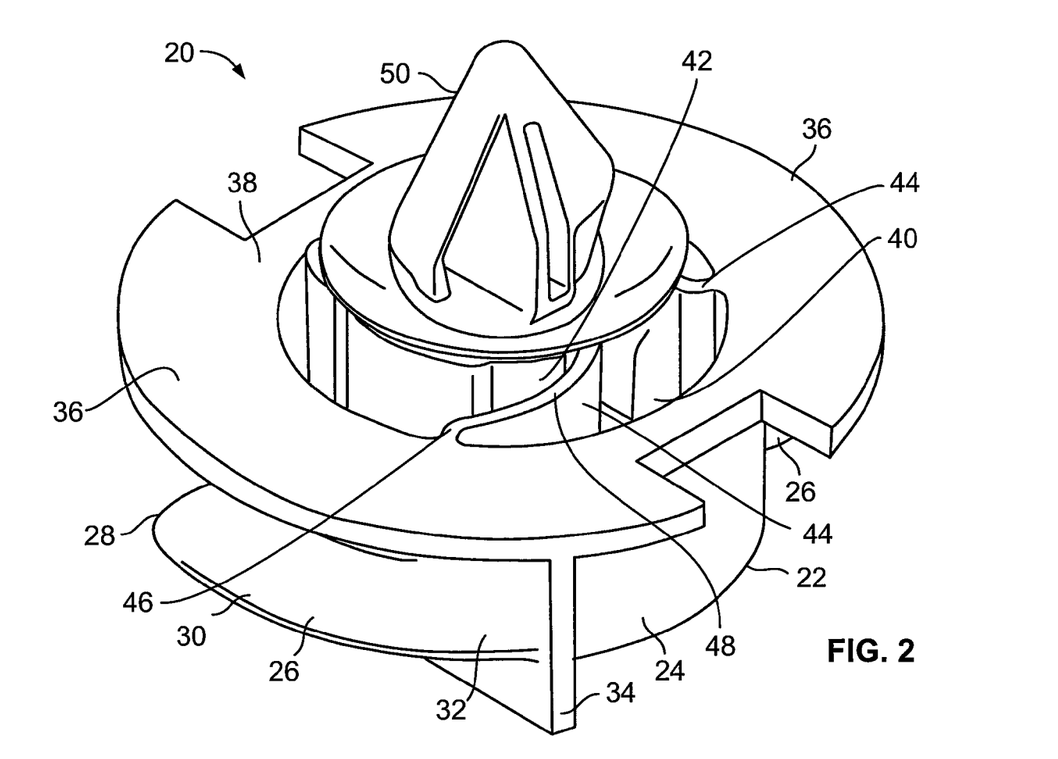
FIG. 2 illustrates an isometric top view of an auger clip assembly, according to an embodiment of the present invention.

FIG. 2 illustrates an isometric top view of an auger clip assembly 20, according to an embodiment of the present invention. The assembly 20 includes a base 22 having a main cylindrical wall 24. Opposing pitched threads 26 extend radially outward from the wall 24. Each thread 26 includes a leading edge 28 that connects to an extension 30 that wraps around a portion of the wall 24. The extension 30, in turn, connects to a trailing end 32. The trailing end 32 connects to a stop flap 34 that tangentially extends from the wall 24.

A flange 36 radially extends from an upper edge 38 of the wall 24. The flange 36 may be perpendicular to the wall 24.

The wall 24 defines a central chamber 40 therebetween. A hub 42 is positioned within the central chamber 40 and connects to inner surfaces of the wall 24 through a plurality of flex ribs 44. The hub 42 may be a cylindrical post. Each flex rib 44 includes a tab 46 that integrally connects to an interior surface of the wall 24. The tab 46 extends away from the wall 24 into the central chamber 40 and connects to a curved beam 48 that follows the general curvature of the wall 24 (but falling toward the hub 42) and connects to the hub 42 through a tab (not shown in FIG. 2) that integrally connects to an outer surface of the hub 42. The curved beam 48 provides flexibility and resilience. The assembly 20 may include three flex ribs 44 evenly spaced about an interior surface of the wall 24 and the outer surface of the hub 42. However, more or less flex ribs 44 may be used.

The flex ribs 44 are thinner than the wall 24 and are configured to allow radial deflection. The radial deflection allows the hub 42 to move within the central chamber 40 to allow for alignment of a connection stud 50 with respect to a mating hole or feature formed in a structure.

The connection stud 50 integrally connects to, and extends from, an upper end of the hub 42. The connection stud 50 is axially aligned with respect to the hub 42. The connection stud 50 is configured to securely mate into an opening of a structure, such as an automobile frame. The connection stud 50 may be configured in a variety of orientations and arrangements, depending on a particular application.

Figure 3:
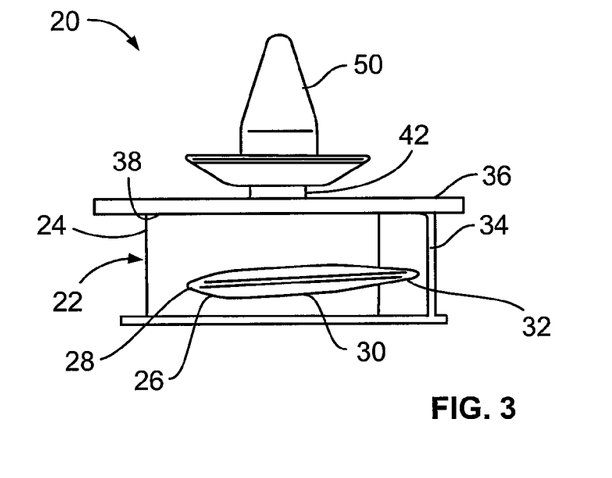
FIG. 3 illustrates a front view of an auger clip assembly, according to an embodiment of the present invention.

FIG. 3 illustrates a front view of the auger clip assembly 20. As shown in FIG. 3, the leading edge 28 of each thread 26 is lower than the trailing end 32. That is, the threads 26 rise from the leading edges 28 to the trailing ends 32. As noted above, the stop flap 34 is generally tangential to the curve of the outer surface of the wall 24. However, the stop flaps 34 may not be tangential to the curve of the outer surface of the wall 24. Instead, the stop flaps 34 may merely be straight edges that outwardly extend from the outer surface of the wall 24. As such, the stop flaps 34 may be clasp- or barb-like.

Figure 4:
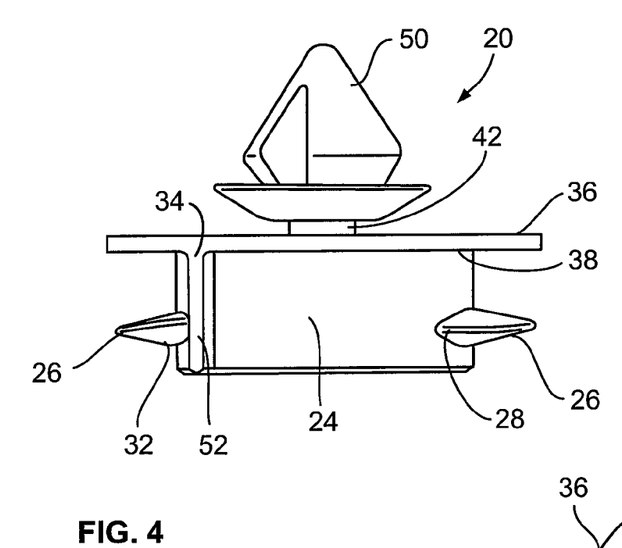
FIG. 4 illustrates a side view of an auger clip assembly, according to an embodiment of the present invention.

FIG. 4 illustrates a side view of the auger clip assembly 20. As shown in FIG. 4, an exposed end 52 of the stop flap 34 provides a distinct barrier. Because the stop flap 34 may be tangential to the curve of the outer surface of the wall 24 (e.g., an obtuse angle is formed on one side of the flap 34 and an acute angle is formed on the other side of the flap 34 with respect to the wall 24), rotation through a foam panel in one direction is permitted, while rotation in the opposite direction may be hindered by the stop flap 34.

Figure 5:
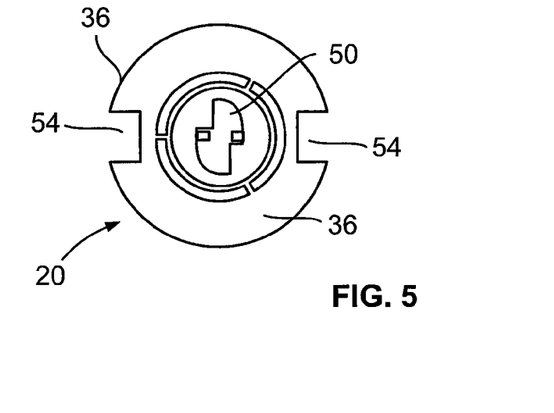
FIG. 5 illustrates a top view of an auger clip assembly, according to an embodiment of the present invention.

FIG. 5 illustrates a top view of the auger clip assembly 20. Notches 54 may be formed in the flange 36. The notches 54 may be spaced 180° from one another. The notches 54 cooperate to act as a cog to allow a tool having a reciprocal feature to quarter turn the assembly 20 with respect to a foam substrate or panel. Alternatively, the flange 36 may not have notches formed therethrough.

The diameter of the flange 36 is configured to be larger than an opening formed in a foam panel into which the assembly 20 is to be positioned. Thus, the flange 36 prevents the assembly 20 from dropping through the foam panel.

Figure 6:
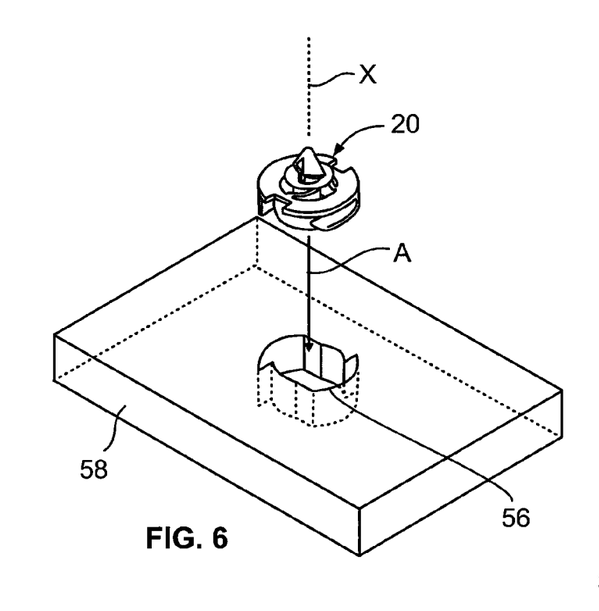
FIG. 6 illustrates an isometric view of an auger clip assembly aligned with a mating opening formed in a foam panel, according to an embodiment of the present invention.

FIG. 6 illustrates an isometric view of the auger clip assembly 20 aligned with a mating opening 56 formed in a foam panel 58, according to an embodiment of the present invention. The central axis X of the assembly 20 is aligned over the center of the opening 56. The assembly 20 is then urged into the opening in the direction of arrow A.

Figure 7:
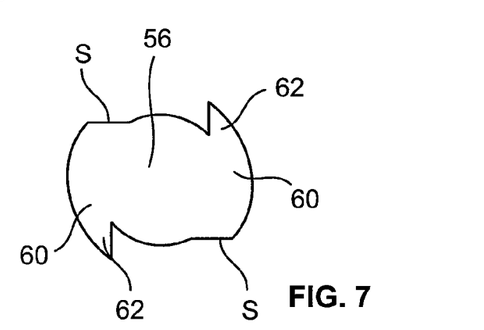
FIG. 7 illustrates an axial cross sectional view of a mating opening formed in a foam panel, according to an embodiment of the present invention.

FIG. 7 illustrates an axial cross sectional view of the mating opening 56 formed in a foam panel 58, according to an embodiment of the present invention. The mating opening 56 mirrors the axial cross-section of the wall 24, threads 26 and stop flaps 34 of the assembly 20 (shown in FIGS. 2-6). Thus, in order to position the assembly 20 into the opening 56, the threads 24 are aligned with thread passages 60 such that the stop flaps 34 align with distinct straight openings 62. The opening 56 may be custom designed to receive the auger clip assembly 20 only when it is aligned in this manner. As shown in FIG. 7, the opening 56 generally allows the assembly 20 to be inserted in only one orientation, due to the axially asymmetrical profile of the opening 56. The mating opening 56 resembles a bat like shape having one "wing" pointed down and the other "wing" pointing up.

Figure 8:
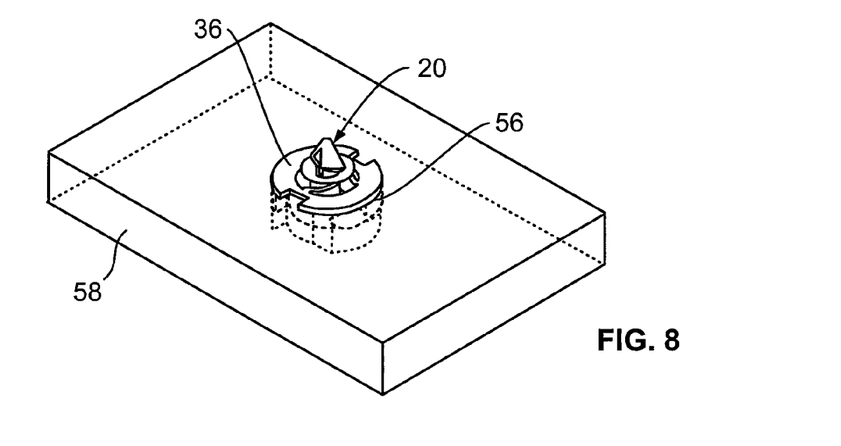
FIG. 8 illustrates an isometric view of an auger clip assembly placed in a mating opening formed in a foam panel, according to an embodiment of the present invention.

FIG. 8 illustrates an isometric view of the auger clip assembly 20 placed in the mating opening 56 formed in the foam panel 58. In this position, an underside of the flange 36 is positioned above edge portions of foam that define the opening 56.

Figure 9:
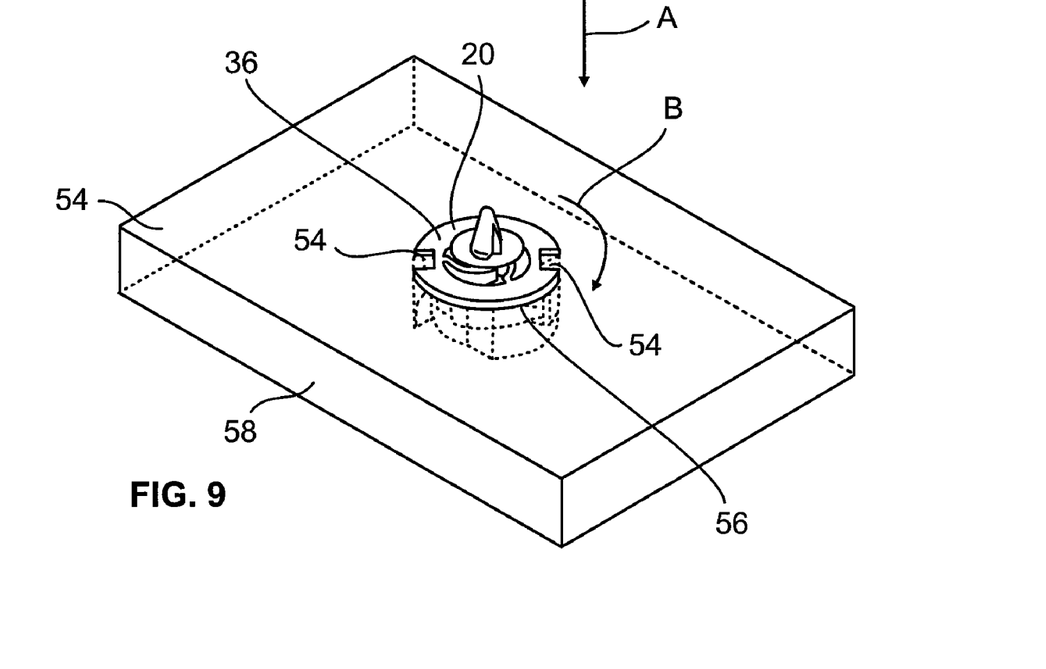
FIG. 9 illustrates an isometric view of an auger clip assembly being rotated in a mating opening formed in a foam panel, according to an embodiment of the present invention.

FIG. 9 illustrates an isometric view of the auger clip assembly 20 being rotated in the direction of arc B in the mating opening 56 formed in the foam panel 58. Referring to FIGS. 2-5 and 9, a tool engages the notches 54 formed through the flange 36. The tool is then manipulated to the rotate the assembly 20 in the direction of arc B. As the assembly 20 rotates in the direction of arc B, the leading edges 28 of the threads 26 dig into the foam surrounding the opening 56. Due to the pitch of the threads 26, as the assembly 20 rotates, the assembly 20 moves downward into the foam panel 58 in the direction of arrow A. During this downward movement, foam around the opening 56 displaces around the threads 26, thereby preventing the assembly 20 from being pulled out of the panel in a direction opposite that of arrow A.

Figure 10:
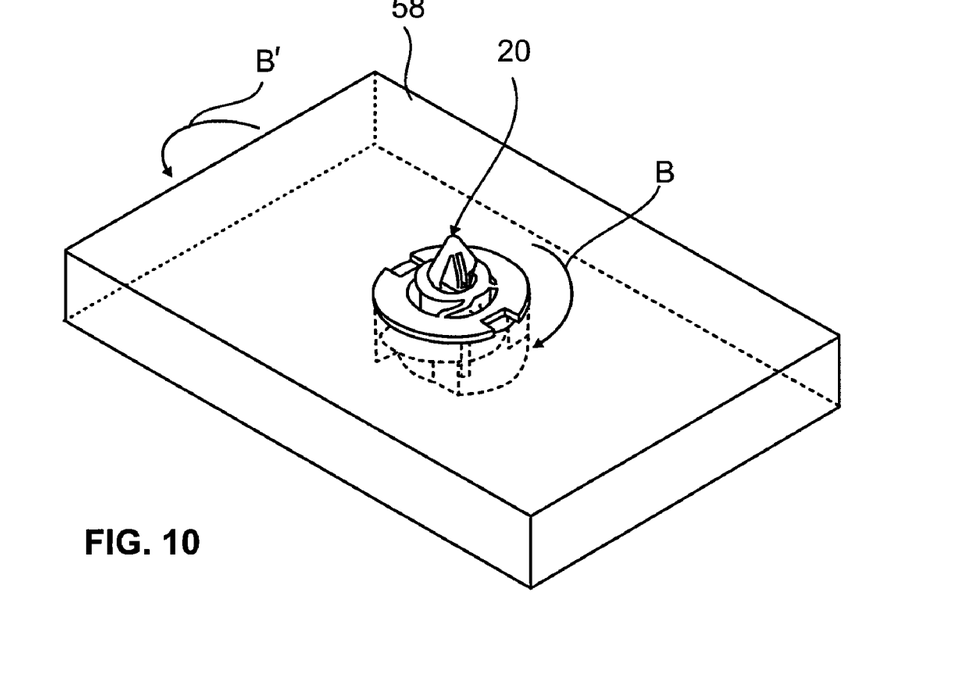
FIG. 10 illustrates an isometric view of an auger clip assembly securely positioned in a mating opening formed in a foam panel, according to an embodiment of the present invention.

FIG. 10 illustrates an isometric view of the auger clip assembly 20 securely positioned in the mating opening 56 formed in the foam panel 58. Referring to FIGS. 2-5 and 10, the auger clip assembly 20 is continually rotated until it reaches a quarter turn (i.e., 90°). After being rotated a quarter turn, a lower surface of the flange 36 abuts against an upper surface of the foam that defines the mating opening 56. The flange 36 prevents the assembly 20 from falling through the opening 56. In the quarter turn position, the stops 34 are lodged against foam in the positions S, as shown in FIG. 7. As such, the stops 34 prevent the assembly 20 from being further rotated.

It has been discovered that the distinct, asymmetrical shape of the opening 56 and the cross-sectional shape of the threads 26, wall 24 and stop flaps 34 cooperate to secure the assembly 20 to the foam panel 58 through a quarter turn. In this manner, the auger clip assembly 20 secures to the foam panel 58.

In order to disengage the assembly 20 from the foam panel 58, the assembly 20 is rotated in the direction of arc B' that is opposite arc B. During this rotation, the foam recedes from the threads 26 and the assembly 20 moves up in a direction opposite that of arrow A. When the assembly is rotated a quarter turn in the direction of arc B', the threads 26 disengage from the foam and the assembly 20 may be removed.

Figure 11:
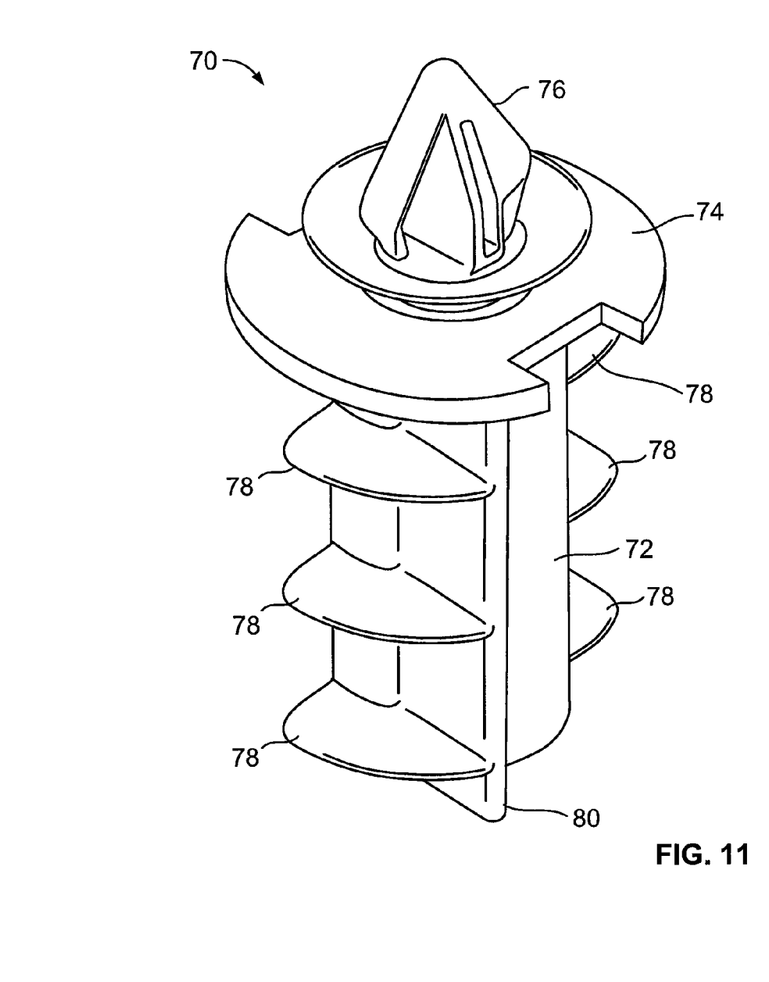
FIG. 11 illustrates an isometric top view of an auger clip assembly, according to an embodiment of the present invention.

FIG. 11 illustrates an isometric top view of an auger clip assembly 70, according to an embodiment of the present invention. The assembly 70 is similar to the assembly 20, shown above, except, instead of a base 22, the assembly 70 includes an extended cylindrical shaft 72 connected to the flange 74. The connection stud 76 is similar to the connection stud 50. The shaft 72 may be an extended form of the base 22. The shaft 72 includes multiple sets of opposed threads 78, that are similar to the threads 26. An elongated stop flap 80 extends tangentially from the cylindrical shaft 72. The extended shaft 72 and multiple threads 78 allow the assembly 70 to be used with thicker foam materials. That is, the extended shaft and multiple sets of threads 78 engage more foam material, and therefore provide a more robust connection, than a single set of threads. As shown in FIG. 11, the shaft 72 and the stud 76 are formed as a single, unitary piece.

Figure 12:
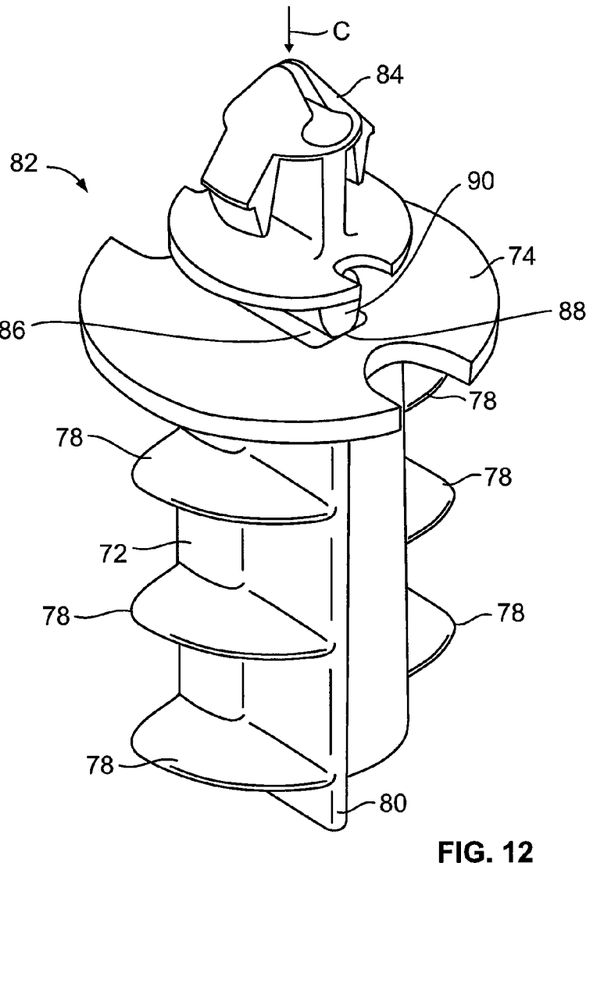
FIG. 12 illustrates an isometric top view of an auger clip assembly, according to an embodiment of the present invention.

FIG. 12 illustrates an isometric top view of an auger clip assembly 82, according to an embodiment of the present invention. The auger clip assembly 82 is similar to the auger clip assembly 70 shown in FIG. 11, except that the connection stud 84 is integrally connected to the shaft 72 over a channel 86 through flash gates 88 on either side of the channel 86 that connect to a top surface of the flange 74. The stud 84 includes a beam 90 that is aligned over the channel 86. The channel 86 is configured to receive the beam 90.

The assembly 82 is formed during a molding process as a unitary piece. After the molding process, the connection stud 84 is temporarily secured to the shaft 72 through the flash gates 88. In order to form a functional assembly 82, the connection stud 84 is urged into the channel 86, thereby breaking the flash gates 88 and allowing the beam 90 to descend into the channel 86.

Figure 13:
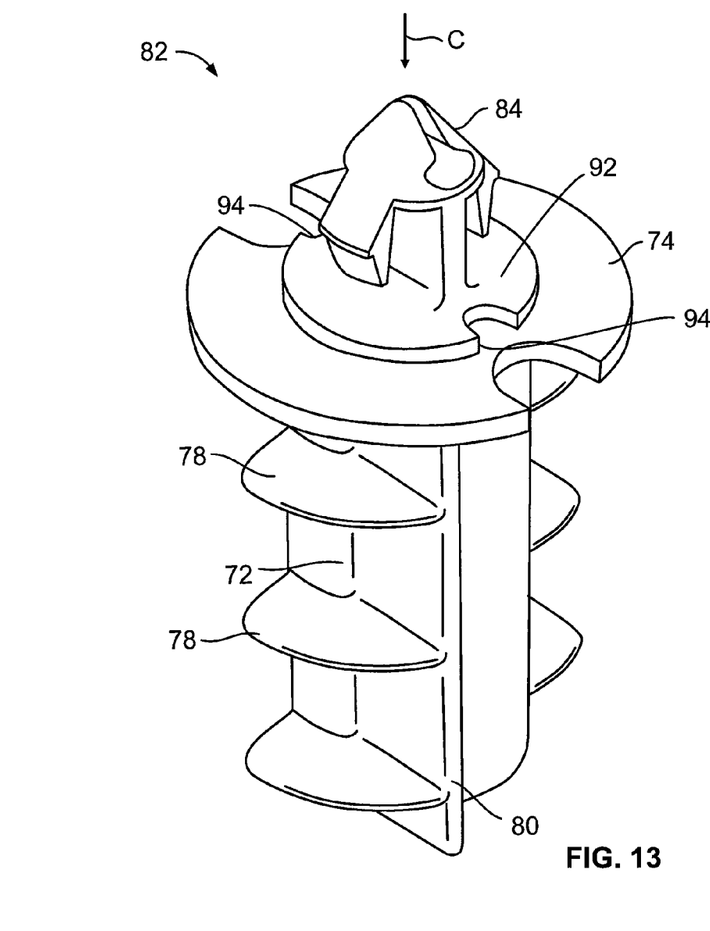
FIG. 13 illustrates an isometric top view of a connection stud urged into a shaft of an auger clip assembly, according to an embodiment of the present invention.

FIG. 13 illustrates an isometric top view of the connection stud 84 urged into the shaft 72 of the auger clip assembly 82. Referring to FIGS. 12 and 13, the connection stud 84 is urged toward the flange 74 in the direction of arrow C. The beam 90 descends into the channel 86. In this position, a lower surface of a flange 92 of the connection stud 84 abuts against an upper surface of the flange 74 of the shaft 72. Also, in this position, the connection stud 84 may be removed from the shaft 72, as the beam 90 is aligned with the channel 86.

In order to securely fasten the connection stud 84 to the shaft 72, the connection stud 84 is rotated to misalign the beam 90 with the channel 86. As noted above, the beam 90 passes through the channel 86. A reduced diameter post or beam (hidden from view in FIG. 13) is disposed within the channel 86 in this position, while the beam 90 is positioned in an open interior chamber (not shown) formed within the shaft 72. Cogs 94 formed in the flange 92 are configured to be engaged by a tool so that the connection stud 84 may be rotated with respect to the shaft 72. Optionally, the cogs may not be present, and the connection stud 84 may simply be rotated by hand.

Figure 14:
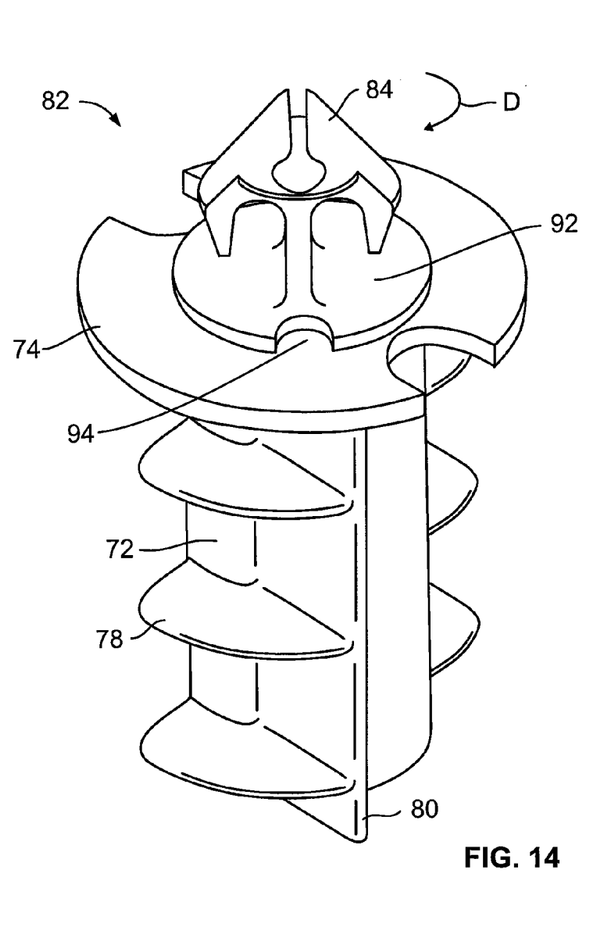
FIG. 14 illustrates an isometric top view of a connection stud rotated with respect to a shaft of an auger clip assembly, according to an embodiment of the present invention.

FIG. 14 illustrates an isometric top view of the connection stud 84 rotated with respect to the shaft 72 of the auger clip assembly 82. The connection stud 84 is rotated with respect to the shaft 72 in the direction of arc D in order to misalign the beam 90 (shown in FIG. 12) with the channel 86 (shown in FIG. 12).

Figure 15:
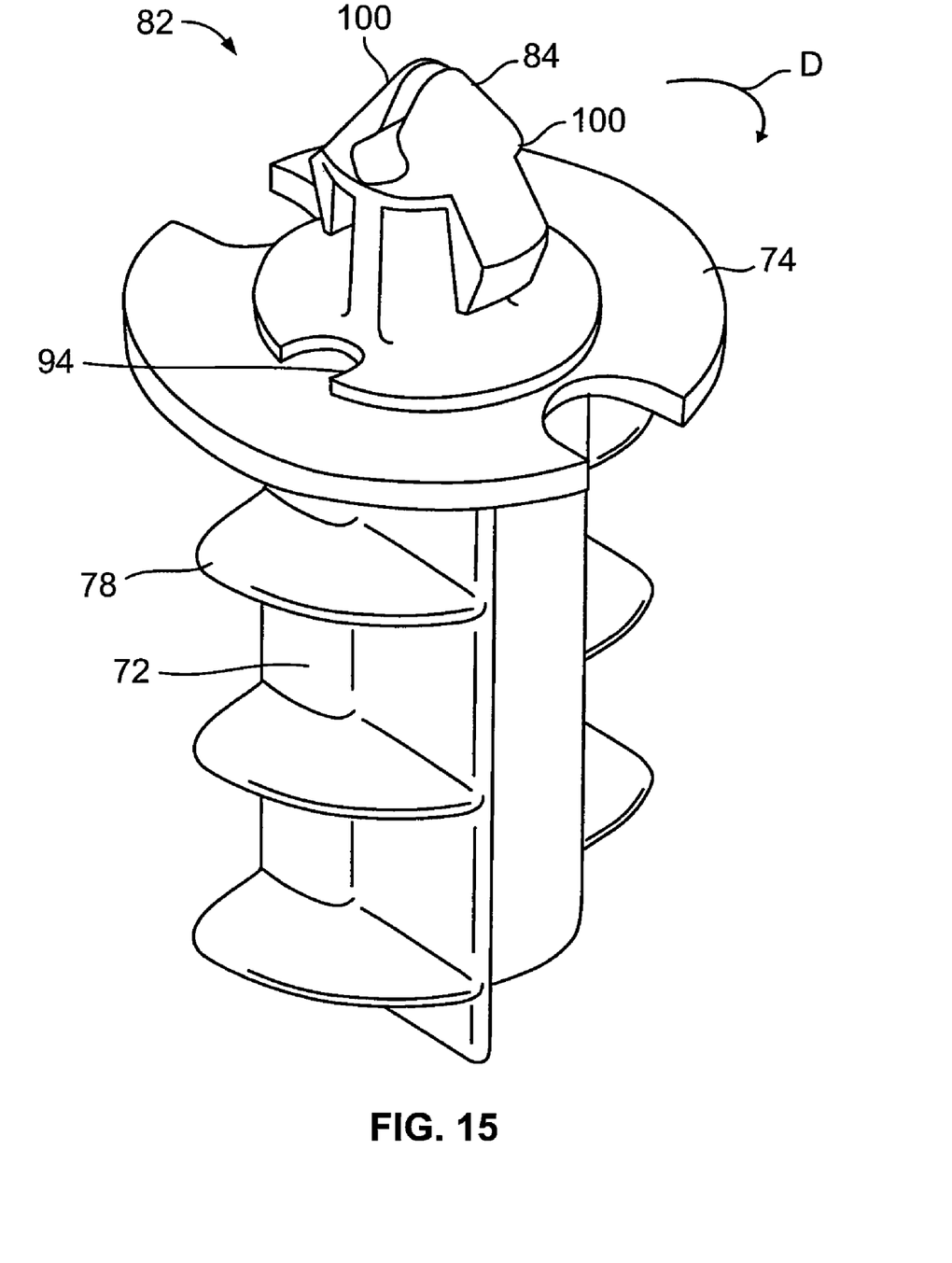
FIG. 15 illustrates an isometric top view of a connection stud secured with respect to a shaft of an auger clip assembly, according to an embodiment of the present invention.

FIG. 15 illustrates an isometric top view of the connection stud 84 secured with respect to the shaft 72 of the auger clip assembly 82. In the fully secured position, the connection stud 84 is rotated a quarter turn (i.e., 90°) with respect to the shaft 72. As such, the beam 90 (shown in FIG. 12) of the connection stud 84 is misaligned by 90° with respect to the channel 86 (shown in FIG. 12), thereby preventing the connection stud 84 from ejecting from the shaft 72.

In order to remove the connection stud 84 from the shaft 72, the connection stud is simply rotated another quarter turn (or in an opposite fashion as to how it was rotated into the secure position) until the beam 90 aligns with the channel 86. When the beam 90 aligns with the channel 86, the connection stud 84 may be removed from the shaft 72. In this manner, one type of connection stud may be interchanged with another type of connection stud. For example, a connection stud 84 having opposed beveled prongs 100 as shown in FIGS. 12-15 may be removed from the shaft 72 and another connection stud bit (such as having a securing configuration as that shown in FIG. 2) may replace the stud 84. Thus, the assembly 82 may utilize interchangeable studs having different securing configurations, such as heartflex, Christmas tree, W-base, and various other securing configurations.

Embodiments of the present invention provide auger clip assemblies that secure to foam panels through a 90° turn (i.e., a quarter turn). Thus, embodiments of the present invention provide efficiently designed assemblies that may be quickly and easily secured to foam panels. Embodiments of the present invention provide auger clip assemblies that retain high extraction forces, with short cycle times (as compared to full thread auger fasteners, such as shown in FIG. 1).

While various spatial and directional terms, such as top, bottom, lower, mid, lateral, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. An auger clip assembly configured to be secured to a foam panel, the auger clip assembly comprising:
   a main body having a cylindrical main wall that defines a central chamber;
   a first set of opposed threads radially extending from said main wall, each of said threads comprising a leading edge connected to a trailing end, which is in turn connected to a stop flap that outwardly extends from said main wall; and
   a connection stud secured to said main body, said connection stud configured to securely mate into a reciprocal hole of a structure,
   wherein said main body securely connects to the foam panel within a mating hole through a quarter turn, wherein the mating hole is asymmetrical comprising a central cylindrical channel, a first lateral wing channel oriented in a first direction and a second lateral wing channel oriented in a second direction, and wherein said main body passes into the mating hole when aligned in a first orientation.

2. The auger clip assembly of claim 1, wherein said connection stud is secured to said main wall through a hub secured within said central chamber through a plurality of flex ribs that integrally connect to said main wall, said plurality of flex ribs allowing said connection stud to shift into an aligned position with respect to the reciprocal hole.

3. The auger clip assembly of claim 1, wherein said stop flap tangentially extends from said main wall.

4. The auger clip assembly of claim 1, comprising a flange that prevents the auger clip assembly from completely passing through the mating hole.

5. The auger clip assembly of claim 1, wherein said first set of opposed threads includes two threads equally spaced from one another about said main wall, each of said threads being pitched.

6. The auger clip assembly of claim 1, wherein said connection stud comprises a first securing configuration, said connection stud being interchangeable with another connection stud having a second securing configuration.

7. The auger clip assembly of claim 1, wherein said connection stud rotatably locks into a secured position with respect to said main body through a quarter turn.

8. The auger clip assembly of claim 1, wherein said main body comprises a shaft.

9. The auger clip assembly of claim 1, comprising at least a second set of opposed threads radially extending from said main wall, wherein said first set of opposed threads is located on a different level than said second set of opposed threads.

10. The auger clip assembly of claim 1, comprising at least a second set of opposed threads radially extending from said main wall, wherein said first set of opposed threads is located on a different level than said second set of opposed threads.

11. The auger clip assembly of claim 4, wherein said flange comprises at least one notch configured to be engaged by a tool that is used to rotate said main body.

12. A securing system comprising:
    a foam panel comprising an asymmetrical mating hole having a central cylindrical channel, a first lateral wing channel oriented in a first direction and a second lateral wing channel oriented in a second direction;
    an auger clip assembly configured to be secured within said mating hole of said foam panel, said auger clip assembly comprising:
       a main body having a cylindrical main wall that defines a central chamber;
       a first set of opposed threads radially extending from said main wall, each of said threads comprising a leading edge connected to a trailing end, which is in turn connected to a stop flap that outwardly extends from said main wall, said main body passing into the mating hole when aligned in a passing orientation in which said opposed threads are aligned with thread openings formed in said mating hole, said mating hole preventing said main body from passing therein if aligned in an orientation other than the passing orientation; and
       a connection stud secured to said main body, said connection stud configured to securely mate into a reciprocal hole of a structure,
       wherein said main body securely connects to said foam panel within said asymmetrical mating hole through a quarter turn.

13. The securing system of claim 12, wherein said connection stud is secured to said main wall through a hub secured within said central chamber through a plurality of flex ribs that integrally connect to said main wall, said plurality of flex ribs allowing said connection stud to shift into an aligned position with respect to the reciprocal hole.

14. The securing system of claim 12, wherein said stop flap tangentially extends from said main wall.

15. The securing system of claim 12, wherein said auger clip assembly comprises a flange that prevents said auger clip assembly from completely passing through the mating hole.

16. The securing system of claim 12, wherein said first set of opposed threads includes two threads equally spaced from one another about said main wall, each of said threads being pitched.

17. The securing system of claim 12, wherein said connection stud comprises a first securing configuration, said connection stud being interchangeable with another connection stud having a second securing configuration.

18. The securing system of claim 12, wherein said connection stud rotatably locks into a secured position with respect to said main body through a quarter turn.

19. The securing system of claim 12, wherein said main body comprises a shaft.

20. The securing system of claim 12, wherein said auger clip assembly comprises at least a second set of opposed threads radially extending from said main wall, wherein said first set of opposed threads is located on a different level than said second set of opposed threads.

21. The securing system of claim 15, wherein said flange comprises at least one notch configured to be engaged by a tool that is used to rotate said main body.

22. An auger clip assembly configured to be secured to a foam panel, the auger clip assembly comprising:
- a main body having a cylindrical main wall that defines a central chamber;
- a first set of opposed threads radially extending from said main wall, said first set of opposed threads comprising two threads equally spaced from one another about said main wall, each of said threads being pitched, each of said threads comprising a leading edge connected to a trailing end, which is in turn connected to a stop flap that tangentially extends from said main wall, wherein said main body securely connects to the foam panel within an asymmetrical mating hole through a quarter turn, wherein a foam material surrounding the mating hole displaces around said threads during said quarter turn to secure said main body to the foam panel, said asymmetrical mating hole having a central cylindrical channel, a first lateral wing channel oriented in a first direction and a second lateral wing channel oriented in a second direction, such that said main body passes into the mating hole when aligned in a first orientation;
- a flange that prevents the auger clip assembly from completely passing through the mating hole, said flange having opposed notches configured to be engaged by a tool that is used to rotate said main body; and
- a connection stud secured to said main body, said connection stud configured to securely mate into a reciprocal hole of a structure.

23. The auger clip assembly of claim 22, wherein said connection stud is secured to said main wall through a hub secured within said central chamber through a plurality of flex ribs that integrally connect to said main wall, said plurality of flex ribs allowing said connection stud to shift into an aligned position with respect to the reciprocal hole.

24. The auger clip assembly of claim 22, wherein said connection stud comprises a first securing configuration, said connection stud being interchangeable with another connection stud having a second securing configuration.

25. The auger clip assembly of claim 22, wherein said connection stud rotatably locks into a secured position with respect to said main body through a quarter turn.

\* \* \* \* \*